Dec. 16, 1969     J. T. COCHRAN ET AL     3,483,980
COLD TRAP FILTER
Filed Jan. 25, 1967                         2 Sheets-Sheet 1
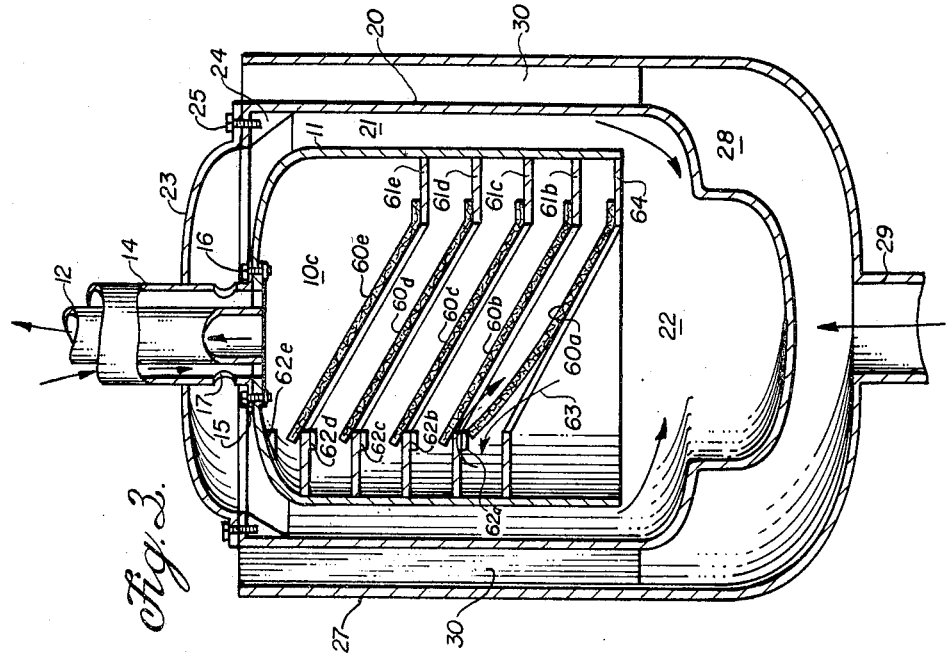
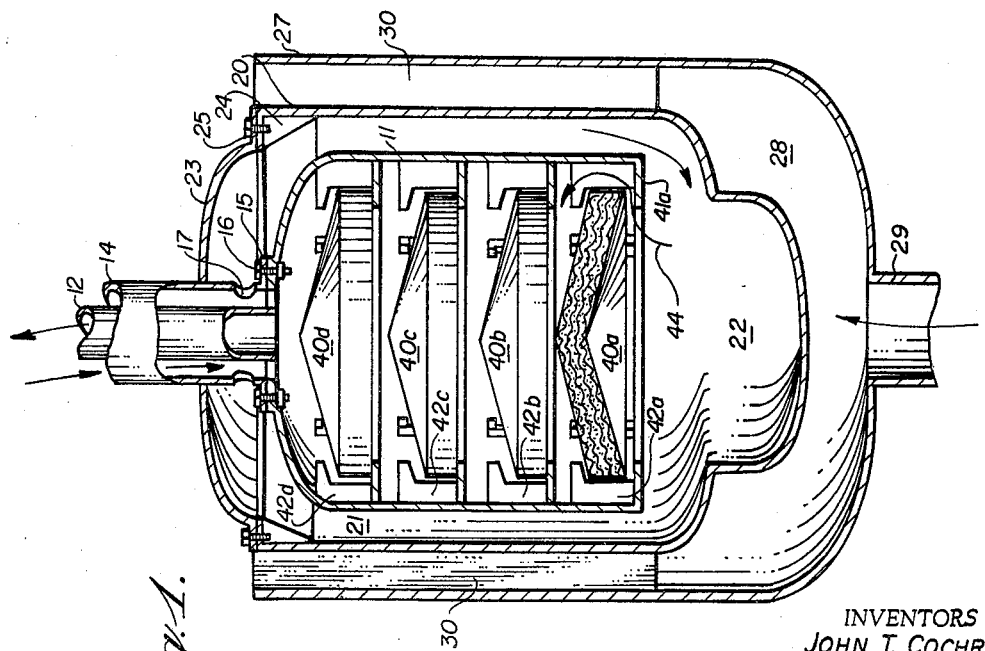
INVENTORS
JOHN T. COCHRAN
GORDON D. COLLINS
BY
ATTORNEY

INVENTORS
JOHN T. COCHRAN
GORDON D. COLLINS
BY
ATTORNEY

United States Patent Office 3,483,980
Patented Dec. 16, 1969

3,483,980
COLD TRAP FILTER
John T. Cochran, San Jose, and Gordon D. Collins, Los Altos, Calif., assignors to the United States of America as represented by the United States Atomic Energy Commission
Filed Jan. 25, 1967, Ser. No. 612,291
Int. Cl. B01d *35/14*
U.S. Cl. 210—131                         9 Claims

ABSTRACT OF THE DISCLOSURE

This invention relates to cold traps for removing sodium oxide from liquid sodium used as a coolant for a nuclear reactor. Sodium oxide is caused to crystallize upon screens which operate as valves or cause a valve to operate letting sodium bypass the clogged screen. In one embodiment, the screen flexes when it becomes clogged to spall or shake off sodium oxide crystals, thereby affording a self-cleaning action.

BACKGROUND OF THE INVENTION

The invention described herein was made in the course of, or under, Contract No. AT(04–3)–540 with the United States Atomic Energy Commission.

This invention relates to impurity removal devices, and in particular to cold trap filters used for the removal of impurities in the fluids flowing therethrough.

In cold traps for fluids in which the impurities are deposited on an assembly of sequential screens or filter elements, the impurities tend to deposit largely on the surface of the filter elements facing the fluid flow. The filter material behind this front surface remains generally unused, once the front surface has become completely clogged with deposited material. In some cases, less than 20% of the designed holding capacity of the filter assembly is used. In addition, as the face of the filter elements becomes clogged, the pressure drop across the filter assembly increases, which, if not checked, either stops the flow of fluid entirely, or causes the filter assembly to collapse, destroying the impurity removal capability of the trap. Thus, frequent maintenance or replacement is required to achieve satisfactory operation of such traps.

SUMMARY OF THE INVENTION

The cold trap of the present invention is arranged to more efficiently utilize the filter element material employed to remove the impurities by offering a large surface upon which the impurities may collect, and to prevent collapse of the filter element material or blockage to the flow of fluid by arranging the assembly for automatically bypassing the flow of fluid around those filter elements which have become clogged. In addition, in one embodiment of this invention, the filter elements are arranged to permit the automatic removal of deposited material from the clogged filter during operation of the trap. In another embodiment, impurity removal from the filter may be achieved by converting the impurities embedded in the filter into a mobile form and re-crystallizing them at a location outside the filter.

It is therefore an object of this invention to provide a cold trap for fluids utilizing impurity-collecting filter elements.

It is another object of this invention to provide a cold trap for fluids having impurity-collecting filter elements in which the filter elements which have become clogged with impurities do not impede the flow of fluid through the trap.

It is another object of this invention to provide a cold trap for fluids having impurity-collecting filter elements in which the impurities collected on the filter are automatically removed when the filter becomes clogged.

It is still another object of this invention to provide a cold trap for fluids having impurity-collecting filter elements in which the impurities collected on the filter are automatically removed when the filter becomes clogged.

It is still another object of this invention to provide a cold trap for fluids having impurity-collecting filter elements in which the filter assembly operates to automatically permit the fluid flow to bypass the filter elements when it becomes clogged.

It is another object of this invention to provide a cold trap for fluids in which a temperature gradient in the fluid is utilized to convert impurities from a mobile form to solid particles for deposit in and on filter elements.

It is another object of this invention to provide a cold trap for fluids in which crystalline impurities deposited on filter elements situated therein may be removed from said filters without dismantling the trap.

Other and more particular objects of this invention will be manifest upon a study of the following detailed description, when taken together with the accompanying drawing.

BRIEF DESCRIPTION OF THE DRAWINGS

FIGURE 1 is a longitudinal section of one embodiment of this invention in which the filter elements are moveable to permit the bypass of fluid when the filter becomes clogged.

FIGURE 3 is a longitudinal section of a third embodiment of this invention in which the filter elements are flexible to permit both the automatic bypass of fluid around the filter when it becomes clogged and the spalling of crystalline impurities from the filter each time the filter element flexes.

DESCRIPTION OF THE PREFERRED EMBODIMENTS

Figure 4:
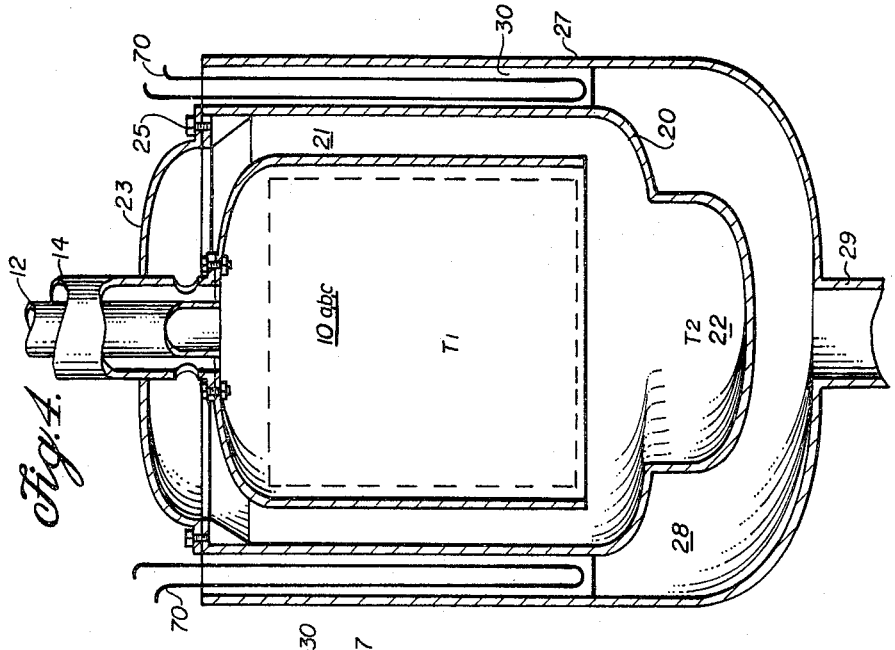
FIGURE 4 is a longitudinal section of the cold trap of this invention showing the arrangement for selectively heating the sodium within the trap to facilitate cleaning the filter elements without dismantling the trap.

The embodiments of the cold trap of this invention and described herein are particularly arranged for use in a nuclear reactor system in which sodium is used as the coolant which contains as its primary impurity sodium oxide in the form of $Na_2O$. This particular impurity is soluble in sodium, the concentration varying inversely with temperature.

In general, the temperature of the liquid sodium passing through the cold trap is lowered to below the point at which crystals of sodium oxide begin to form, by transfer of heat from the sodium to a cooling gas such as air, helium or the like, flowing along the outside surface of the trap. The direction and rate of flow of coolant gas is adjusted to provide a temperature gradient in the sodium flowing into the trap which is lowest, i.e., approximately 250° F. at the point where the sodium enters the filter element portion and is maintained relatively constant or only slightly rising during its passage through the filter. This temperature in the filter element region is maintained in order that the crystals of sodium oxide formed prior to entering the filters will lodge in the filter and provide nuclei upon which larger crystals may grow. After the sodium leaves the filter portion of the trap, its temperature is raised to dissolve any untrapped sodium oxide and thereby prevent the outlet conduit or return line to the reactor from becoming plugged with sodium oxide crystals.

The following Table I lists some typical temperatures that will be found in a sodium cold trap filter of this invention:

TABLE I

| | °F. |
|---|---|
| Economizer (conduit 14) inlet from loop | 820 |
| Economizer (conduit 14 at ports 17) outlet to cold trap | 400 |
| Cold trap (filter section 10) temperature | 250 |
| Economizer (conduit 12 at flange 15) inlet from cold trap | 280 |
| Economizer outlet | 700 |

The filter element material which may be used in the cold trap of the present invention may comprise any self-supporting porous material which will not appreciably chemically react with the sodium or fluid material or its impurities. In the present embodiment, stainless steel wool sheet or stainless steel woven or knitted wire mesh having characteristics and dimensions listed in Table II will be satisfactory.

TABLE II

| | |
|---|---|
| Wire diameter (mils) | 6–8 |
| Bulk density (lb./ft.$^3$) | 3–8 |
| Surface/volume (ft.$^2$/ft.$^3$) | 43–128 |
| Void fraction, void volume/total volume | .993–.983 |
| Average flow-path clearance (in.) | .15–.05 |

Where the filter element material is required to be flexible, as described more fully infra and illustrated in FIGURE 3, a thin stainless wire mesh or equivalent porous sheet material will operate satisfactorily.

It can be seen that, although the embodiment described herein is particularly adapted to removing impurities from liquid sodium, it will operate equally satisfactorily for the removal of impurities in other fluids. For example, carbon dioxide might be removed from a flow of helium by sublimation in the trap of this invention at a temperature below −78.5° C. Phosphorus pentoxide might also be recovered from a flow of gas by sublimation and trapping in the filter of the trap of this invention at temperatures below 180° C., to illustrate another use of this invention.

Figure 2:
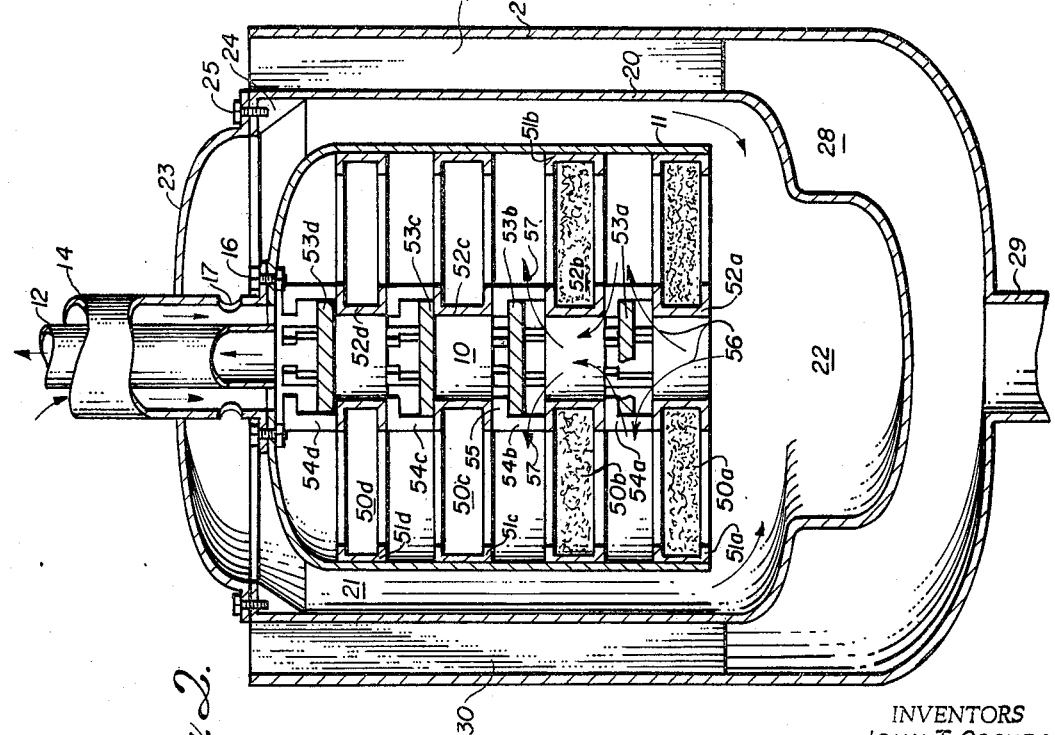
FIGURE 2 is a longitudinal section of another embodiment of this invention in which the filter elements are fixed, but a special valve means is provided to permit automatic bypass of fluid around individual filter elements when they become clogged.

For the present, however, referring generally to FIGURES 1 to 3, all embodiments of the present invention have a central filter element assembly 10 which is instrumental in capturing and trapping the impurities and which is contained in a shroud 11. FIGURES 1 to 3 illustrate each of three possible configurations or embodiments of filter assembly arrangement, and are discussed in greater detail infra.

In common with all embodiments illustrated is shroud 11 which is open at its lower end and fluidly communicating with outlet and hold the various filter element configurations of assembly 10 in place.

Shroud 11 is connected for support to inlet conduit 14 by means of flange 15 and bolts 16. Inlet conduit 14 is arranged concentric around outlet conduit 12 so that incoming hot coolant, in the present case liquid sodium, will give up some of its heat to increase the temperature of the colder liquid sodium in the conduit 12 leaving the trap, a configuration commonly referred to as an "economizer" or counter flow heat exchange relation.

A plurality of ports 17 are provided in inlet conduit 14 to distribute coolant over the outer surface of shroud 11. Flange 15 serves to block the flow of incoming coolant into filter assembly 10 from the top.

Containment vessel 20 is disposed concentric about shroud 11 and spaced apart therefrom to define a plenum passage 21 down which the incoming sodium coolant flows. A cold finger sump portion 22 is formed as part of the lower end of vessel 20 to provide a region of slower fluid velocity where heavy impurities which are suspended in the more rapidly moving liquid sodium in the main stream may be deposited before the coolant enters assembly 10. A cover 23 is provided proximate the top of vessel 20 which is held in place in a sealed relationship with flange 24 by means of bolts 25 or the like fastening means.

An outer shroud 27 is disposed concentric with containment vessel 20 and spaced apart therefrom to define a passage 28 through which gas or liquid (in the present embodiment, a gas) entering through conduit 29 may flow from auxiliary cooling system (not shown) which is used for cooling the sodium contained in vessel 20. To facilitate maximum heat transfer, a plurality of fins 30 are arranged along the vertical sides of the exterior of vessel 20 in passage 28.

Thus, for this basic arrangement, hot liquid sodium containing sodium oxide enters plenum passage 21 of containment vessel 20 through ports 17 from inlet conduit 14. It then passes down through passage 21 between shroud 11 and the wall of containment vessel 20, concurrently being cooled by transferring a portion of its heat to the coolant gas flowing past fins 30 in plenum passage 28 between containment vessel 20 and outer shroud 27. Large agglomerations of sodium oxide, being denser than sodium, will separate in the low velocity region below passage 21 and will fall into the cold finger portion 22. The liquid sodium, now cooled to the temperature at which sodium oxide crystals begin to form, then enters the central filter assembly 10 where the impurities, including $Na_2O$ crystals, are deposited. Because the sodium in assembly 10 is enveloped by sodium in passage 21 and is flowing in a direction counter to the temperature gradient and flow of the sodium in passage 21, it can be seen that the sodium in assembly 10 is no longer cooled, but rather is maintained at a relatively constant temperature or is heated slightly. Since the temperature difference between the sodium flowing into assembly 10 and the sodium flowing in pasasge 21 is small, relative to the temperature difference of the sodium flowing in passage 21 and the cooling gas flowing past fins 30 in passage 28, the rate of heat transfer will be smaller and thus the temperature rise through the filter assembly will be small. For practical purposes, the temperature of the sodium in filter assembly 10 will effectively remain constant as far as the deposition of sodium oxide is concerned.

The sodium then leaves the trap through outlet conduit 12 where it is heated further and more effectively by the flow of hot sodium in inlet conduit 14 which concentrically surrounds outlet conduit 12. A still more effective heating of the exiting coolant in conduit 12 may be achieved by forming conduit 12 into a helix or coil within conduit 14, having its axis of revolution coincident with the longitudinal axis of conduit 14, or alternately a multiplicity of parallel tubes. Such systems are, as previously noted, referred to generally as "economizers."

Referring to FIGURE 1, the filter assembly 10a of this embodiment comprises a plurality of serially arranged, generally horizontally disposed conical filter elements 40a–d, having their peripheral edges normally resting on support rings 41a–d, to form a seal so that sodium will flow sequentially through the filter elements. Support rings 41a–d are sealed and affixed as by welding or the like to the inner surface of the shroud 11.

Filter elements 40a–d are not fixed in position, but are free to move up or down. Sideways movement is limited by a plurality of brackets 42a–d corresponding respectively to elements 40a–d which are provided at their top with a projection 43 which acts as a stop for the upward motion of filters 40a–d. The diameter of elements 40a–d is arranged to be substantially less than the inner diameter of shroud 11 so that there will be sufficient space to permit sodium to flow therearound in the event the filter element becomes clogged.

In operation, when the openings of any of the filter elements become clogged with impurities, i.e., sodium oxide crystals, the pressure drop across the element will naturally tend to increase. When the total pressure drop across the element times the projected area exceeds the weight of the element plus impurities, it will rise, as illustrated by the position of filter element 40a. Its rise will be limited by projections or stops 43 of bracket 42a, and sodium will then flow around the peripheral edges of element 40a, as indicated by arrows 44, thus bypassing the clogged element to continue on to unclogged filter elements 40b–d. In a like manner, when element 40a or any of the other filter elements become clogged, they will also be lifted up from support rings 41b–d respectively, thus permitting coolant to flow through the trap unimpeded.

Referring to FIGURE 2, filter assembly 10b of this embodiment comprises a plurality of serially arranged and spaced apart fixed annular ring filter elements 50a–d, supported at their outer periphery by cylindrical support channels 41a–d, respectively, which are sealed and affixed to the inner surface of shroud 11 as by welding or the like. The central hole of filter elements 50a–d is provided with a cylindrical channel seal ring 42a–d, respectively. A plurality of horizontally disposed flat plates 53a–d are placed on the top of seal rings 52a–d respectively, whereby the peripheral edges of plates 53a–d combined with the top lip of rings 52a–d to form a seal so that sodium will, during normal operation, flow through the filter elements and not past plates 53a–d. Plates 53a–d are not fixed in position, but are free to move up and down. Sideways movement is limited by a plurality of brackets 54a–d, corresponding respectlveiy to plates 53a–d, having a projection or stop 55 which limits the upward motion of plates 53a–d.

In operation, when filter element 50a becomes clogged with impurities, the pressure drop across the element will tend to rise. When the total pressure drop times the plate area exceeds the weight of the plate 53a, it will rise (as shown), acting in the manner of a valve, thus permitting the flow of sodium around plate 53a, bypassing filter element 50a. In a like manner, when the total pressure drop due to clogging across filter element 50b is greater than the weight of plate 53b, it will also be lifted (as shown), permitting the flow of sodium to bypass element 50b. The direction of flow of sodium around plate 53a is illustrated by arrows 56. In this case, the sodium flows from cold finger 22 through the central hole of annular filter element 50, around plate 53a and up through the central hole of annular filter element 50b, since it cannot pass through clogged element 50b. The sodium then continues to flow around plate 53b as indicated by arrows 57, when it then flows up through unclogged filter elements 50c and d.

Thus, in FIGURE 2, the pressure at which the sodium bypasses the filter is determined by the weight of each plate 53a–d. In FIGURE 1, however, the pressure at which the sodium bypasses the filters is determined by the weight of the individual filter elements 40a–d, plus the material deposited therein.

Referring to FIGURE 3, the filter section 10c of this embodiment comprises a plurality of serially arranged, spaced apart flexible filter elements 60a–e, rectangular in shape and supported by frames 61a–e, respectively, which frames are sealed and affixed to the side of shroud 11 as by welding or the like. Filter elements 60a–e in this embodiment are fixed at their lower edge as by welding or the like, but remain free to flexibly move to and away from the other edges of their respective frames 61a–d in the manner of a flap. In normal operation, the peripheral edges of filter elements 60a–e rest against the inner rim of frames 61a–e respectively in the manner of a seal, to cause the sodium flow to be directed only through the filter element. A plurality of brackets 62a–e are provided on the bottom sides of frames 61b–e and the inside top of shroud 11 to act as a stop and limit movement of flexible filter elements 60a–e and permit the flow of coolant around their edges when the filter elements become clogged.

In operation, when element 60a, for example, becomes clogged with impurities, the pressure drop, in a like manner as for the embodiments illustrated in FIGURES 1 and 2, across the element will tend to rise. In embodiment c of FIGURE 3, when the total pressure drop exceeds the forces tending to keep the element flat, as determined by the coefficient of elasticity or flexural strength of the filter element material, the element will bend or flex, as shown for element 60a. The flow of coolant will then bypass the element in the manner indicated by arrow 63, and pass on through the next unclogged element. Since sodium oxide crystals are brittle, the flexing of element 60a, et seq., will tend to cause some of the crystals to fall off or become loosened and be removed from the element so that sodium will again begin to flow through the element. The elements in this particular embodiment are purposely disposed at a downward sloping angle toward their point of attachment to their frames to allow the loosened crystal material to collect in space 64 in the lower portion of frames 61a–e.

When the pressure drop reduced by the removal of some of the collected impurities from element 60a, it will then tend to flex back to its original position on frame 61a, since the pressure drop across the element has been reduced, thus preventing the sodium from bypassing the element until it again becomes clogged sufficiently to cause it to flex again. Thus the filter elements of this embodiment can be said to be automatically self-cleaning.

As for all the embodiments embraced in FIGURES 1 to 3, a technique and apparatus may be used to remove all or a substantial portion of the sodium oxide from the trap to decrease maintenance requirements during its useful life without dismantling the filter assembly. This technique involves converting the sodium oxide in the filter elements into a mobile form and then locally re-crystallizing it in the cold finger portion 22 of the trap.

The use of this technique requires the disconnecting or valving off of the trap from the sodium system or primary sodium loop of the reactor. FIGURE 4 shows the basic cold trap configuration illustrated in FIGURES 1–3, however, with filter assembly 10a,b·c shown only in dashed outline form. A plurality of heaters 70 are placed along the outer surface of containment vessel 20 and adjacent fins 30 in order to heat the sodium in passage 21 and filter assembly 10. During this time, sodium is contained in the trap, but is not allowed to flow through. Sufficient heat is applied so that the temperature, $T_1$, of the sodium in filter assembly 10 reaches a point at which some of the sodium oxide therein dissolves in the sodium. Concurrently, cooling gas is allowed to flow through conduit 29 into plenum 28 at a rate which is sufficient to cool the sodium in cold finger portion 22 of vessel 20, to a temperature, $T_2$, sufficiently lower than $T_1$ so as to set up a temperature diffusion gradient which will move oxide from the screens to the cold finger. By maintaining this temperature difference for a sufficient period of time, the sodium oxide crystals in cold finger 22 will grow at the expense of crystals in the filter element and other parts of the cold trap. This preferential deposition of oxide will extend the life of the cold trap. Removal of the sodium oxide may be achieved merely by removing bolts 25 of cover 23, removing vessel 20 and cleaning out cold finger section region 22.

Although the foregoing embodiment has been described in detail, there are obviously many other embodiments and variations in configuration which can be made by a person skilled in the art without departing from the spirit, scope or principle of this invention.

What we claim is:

1. A cold trap filter for removing from a fluid stream impurities whose solubility in the fluid changes with temperature; comprising container means having an inlet means in one end portion thereof adapted to supply said container means a fluid stream from an associated fluid containing system; shroud-like means mounted in said container means having one end portion thereof open for fluid communication with said container means and having an outlet means in another portion thereof, said outlet means being concentrically positioned within said inlet means of said container means for providing a heat exchange relationship between associated fluid passing therethrough, said shroud-like means being mounted in spaced relationship with respect to said container means to define a plenum therebetween; a plurality of filter assembly means positioned within said shroud-like means upon which impurities from an associated fluid flowing therethrough may deposit upon change of temperature conditions of such an associated fluid, said filter assembly means being serially located within said shroud-like means between said open end portion and said outlet means thereof, said plurality of filter assembly means each being constructed to sequentially provide bypass flow of an associated fluid therepast upon clogging thereof by impurities from such an associated fluid; and cooling shroud means positioned externally and in spaced relationship around at least a portion of said container means within which said shroud-like means is located for directing an associated cooling media past said container means; wherein fluid having impurities soluble therein flows into said container means from said inlet means through said filter assembly means located in said shroud-like means and discharges through said outlet means in such a manner that incoming fluid is in heat exchange relation with outgoing fluid which functions to cool incoming fluid and heat outgoing fluid while maintaining fluid passing through said filter assembly means at a temperature substantially below the temperature of fluid in said inlet means, and wherein associated cooling media flowing through said cooling shroud means functions to further cool associated fluid in said container prior to passage of such associated fluid through said filter assembly means, whereby lower temperature of such associated fluid causes impurities therein to precipitate out of such associated fluid and deposit on said filter assembly means, and whereby pressure buildup due to said filter assembly means becoming clogged by the deposit of impurities thereon cause said plurality of filter assembly means to be sequentially bypassed by associated fluid as each filter assembly means becomes sufficiently clogged.

2. Apparatus as described in claim 1, wherein said filter assembly means each comprises a support ring secured to said shroud-like means, a filter element resting in sealed relation on said support ring, and guide and stop means associated with said support ring and positioned about the periphery of said filter element for controlling movement of said filter element away from said support ring by back pressure buildup as said filter element becomes clogged by impurities, providing bypass flow of an associated fluid around said filter element.

3. Apparatus as described in claim 1, wherein said filter assembly means each comprises a filter element fixed in said shroud-like means, and valve means centrally adjacent said filter element, said valve means being constructed for activation by back pressure buildup as said filter element becomes clogged by impurities, providing bypass flow of an associated fluid past said filter element.

4. Apparatus as described in claim 1, wherein each of said filter assembly means comprises a support means secured to said shroud-like means, a filter element constructed of a flexible filter material supported on said support means and fixedly secured at one end thereto, whereby back pressure buildup as said filter element becomes clogged by impurities causes said filter element to flex at the unsecured end thereof providing bypass flow of an associated fluid past said filter element and for the spalling off of the deposit of impurities lodged thereon.

5. Apparatus as described in claim 1, wherein said associated fluid is liquid sodium, and wherein said impurities are sodium oxide.

6. Apparatus as described in claim 1, wherein said associated fluid is a liquid metal coolant, and wherein said impurities are crystalline solids.

7. Apparatus as described in claim 1, wherein said cooling shroud means is constructed to provide a temperature gradient in associated fluid within said container means which is decreasing from said input means into said container means to said filter assembly means and substantially constant through said filter assembly means.

8. Apparatus as described in claim 1, additionally including means for removal of impurities from said filter assembly means comprising means for heating said filter assembly means to convert impurities in said filter assembly means to a mobile form, and means cooperating with said cooling shroud means for cooling associated fluid with impurities in mobile form outside of said filter assembly means to convert such impurities back to a solid form to precipitate from said fluid for collection within said container means, said means cooperating with said cooling shroud means constituting a sump-like portion of said container means.

9. The cold trap filter defined in claim 1, wherein said container means includes a sump-like portion in the end thereof opposite said inlet means in spaced relation with said open end portion of said shroud-like means and adjacent an inlet section of said cooling shroud means.

References Cited

UNITED STATES PATENTS

| | | | |
|---|---|---|---|
| 2,098,102 | 11/1937 | McLean | 210—130 X |
| 2,151,538 | 3/1939 | Swanson | 210—131 |
| 2,597,217 | 5/1952 | Zenick | 210—131 |
| 2,654,482 | 10/1953 | Robinson et al. | 210—356 |
| 2,745,552 | 5/1956 | Bruggeman et al. | 210—186 X |
| 2,770,368 | 11/1956 | Tisher | 210—132 |
| 2,895,613 | 7/1959 | Griffiths | 210—130 |
| 2,998,138 | 8/1961 | Mould et al. | 210—132 X |
| 3,268,077 | 8/1966 | Ball | 210—131 |

REUBEN FRIEDMAN, Primary Examiner

W. S. BRADBURY, Assistant Examiner

U.S. Cl. X.R.

55—68, 82, 269, 312, 485; 210—132, 186, 335, 339, 356